United States Patent [19]

Vertes et al.

[11] 4,046,852

[45] Sept. 6, 1977

[54] PURIFICATION PROCESS FOR TECHNICAL GRADE MOLYBDENUM OXIDE

[75] Inventors: Michael A. Vertes, Weston, Conn.; Richard A. Ronzio, Golden, Colo.; Tommy C. Kearns, Argyle, Iowa

[73] Assignee: Amax Inc., Greenwich, Conn.

[21] Appl. No.: 687,675

[22] Filed: May 19, 1976

[51] Int. Cl.² .................................... C01G 39/00
[52] U.S. Cl. ............................... 423/58; 423/53; 423/54; 423/61; 423/606; 423/593
[58] Field of Search ............... 423/53, 54, 61, 56–58, 423/606, 593

[56] References Cited

U.S. PATENT DOCUMENTS

| | | | |
|---|---|---|---|
| 2,965,447 | 12/1960 | Zimmerley et al. | 423/55 |
| 3,714,325 | 1/1973 | Bloom et al. | 423/53 |
| 3,829,550 | 8/1974 | Ronzio et al. | 423/54 |
| 3,848,049 | 11/1974 | Ronzio et al. | 423/54 |
| 3,860,419 | 1/1975 | Weber et al. | 423/53 |
| 3,932,580 | 1/1976 | Vertes et al. | 423/56 |
| 3,957,946 | 5/1976 | Ronzio et al. | 423/61 |
| 3,988,418 | 10/1976 | Kerfoot et al. | 423/54 |

Primary Examiner—Herbert T. Carter
Attorney, Agent, or Firm—Harness, Dickey & Pierce

[57] ABSTRACT

A process for purifying an impure molybdenum oxide concentrate feed material to remove therefrom the predominant portion of contaminating metals present by autoclaving at an elevated temperature under an oxygen partial pressure of at least about 100 psi, a slurry of the particulated feed material in an aqueous acid solution containing a mineral acid for a period of time sufficient to convert the predominant portion of molybdenum compounds to molybdenum trioxide and to convert the contaminating metal compounds present to aqueous acid soluble compounds. The autoclaved slurry is thereafter filtered and the solids are subjected to an aqueous alkali hydroxide leach treatment to extract the molybdenum trioxide constituent therein in the form of alkali metal molybdate compounds, which subsequently are recovered from the leach liquor in the form of a high purity alkali metal molybdate product. When ammonium hydroxide is employed, the ammonium molybdate product may be further calcined to produce a high purity molybdic oxide product.

10 Claims, 2 Drawing Figures

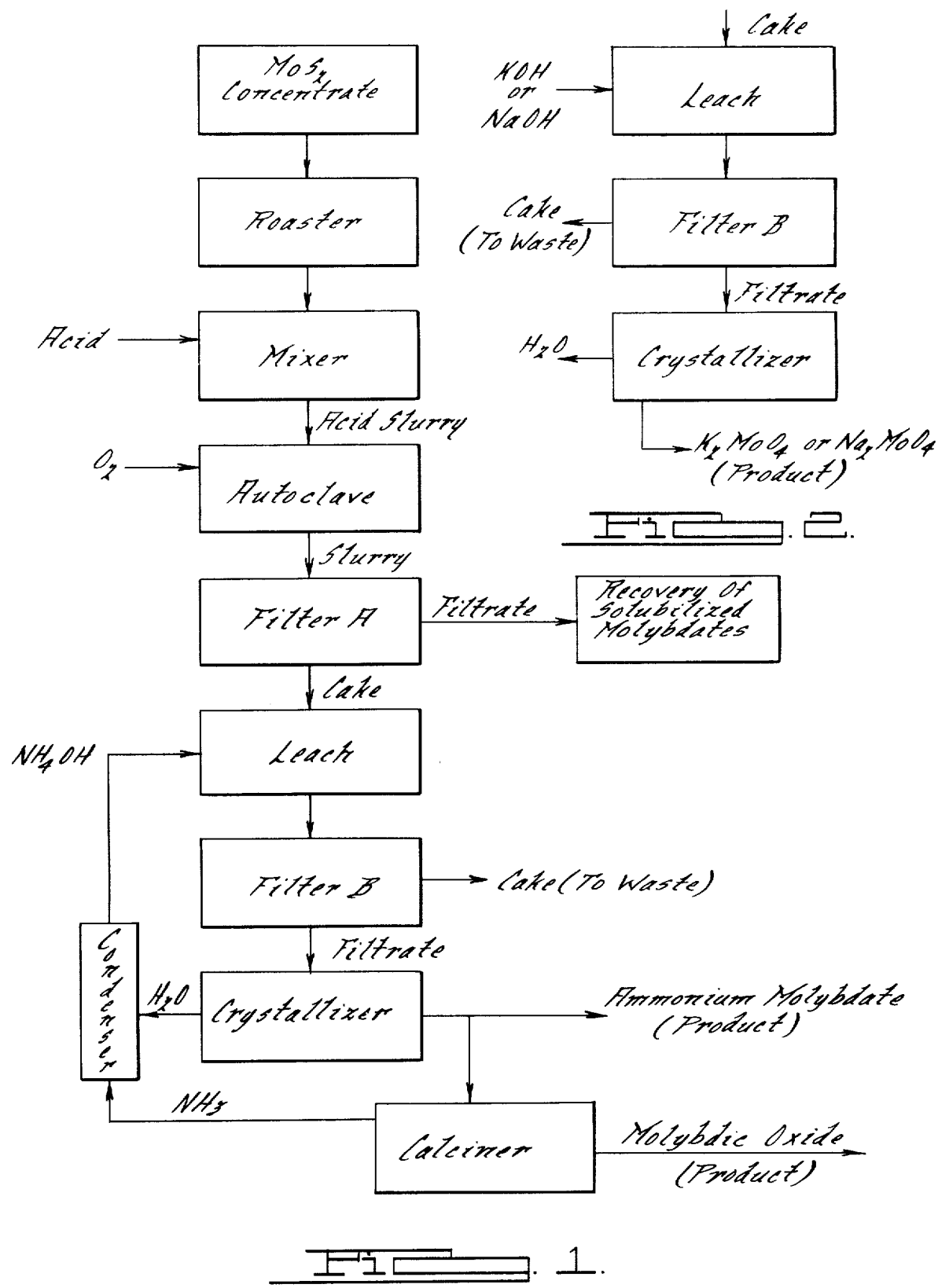

PURIFICATION PROCESS FOR TECHNICAL GRADE MOLYBDENUM OXIDE

BACKGROUND OF THE INVENTION

High purity molybdenum oxide, potassium molybdates, sodium molybdates and ammonium molybdates are of commercial inportance in synthesizing various molybdenum compounds of chemical grade for use in the production of molybdenum catalysts and for reduction to the metallic state, such as by hydrogen reduction, to produce a high purity molybdenum metal.

A variety of processes and purification techniques have heretofore been used or proposed for use for removing a variety of normally-occurring contaminating metals and/or contaminating metal compounds in technical grade molybdenum oxide concentrates. Such contaminating metals typically include potassium, manganese, lead, tin, calcium, magnesium, iron, copper and aluminum, the concentration of which varies depending on the particular ore body from which the molybdenite ($MoS_2$) is obtained, and the type and severity of the beneficiation process by which the molybdenite ore is concentrated. Typical of such prior art processes for purifying technical grade molybdenum oxide concentrates are those described in U.S. Pat. Nos. 3,658,464; 3,829,550 and 3,848,049, which are assigned to the same assignee as the present invention. While the foregoing processes have been effective in reducing the concentration of contaminating metals and metallic compounds in technical grade molybdic oxide feed materials, there has been a continuing need for a purification process which is more efficient, which provides for increased yields of the purified molybdenum product, which is more economical to operate, and which reduces the volume of waste streams generated, thereby minimizing waste treatment operations with attendant further cost savings.

The present invention overcomes many of the shortcomings and disadvantages associated with prior art purification techniques by providing a process which is efficient, economical, simple to control, increases the yield of the purified molybdenum product produced, and wherein the purified product is substantially devoid of any residual contaminating metal or metal compounds therein.

SUMMARY OF THE INVENTION

The benefits and advantages of the present invention are achieved by a process in which an impure molybdenum oxide feed material, such as derived from the air roasting of a molybdenite concentrate, is admixed with an aqueous acid solution to form a slurry containing from about 10% up to about 40% solids and is autoclaved at an elevated temperature of from about 150° C up to about 350° C in the presence of a free oxygen partial pressure of at least about 100 psi. The aqueous acid solution contains a mineral acid selected from the group consisting of sulfuric acid, nitric acid, hydrochloric acid, as well as mixtures thereof, in an amount stoichiometrically in excess of that required to react with the contaminating metal and metal compounds present in the feed material. The autoclaving step is carried out for a time period generally ranging from about 30 minutes up to about 90 minutes and sufficient to convert the predominant portion of sub-oxides of molybdenum to molybdenum trioxide and to convert the predominant portion of contaminating metals and metal compounds to solution soluble compounds. The resultant autoclaved slurry is thereafter subjected to a separation treatment in which the solids are recovered and are leached with an aqueous alkali hydroxide solution to produce a high purity alkali metal molybdate product. When an ammonium molybdate product is produced, it can be subjected to a further calcination treatment to to produce a high purity molybdenum trioxide product.

It is also contemplated that the aqueous acid solution from the autoclaving step can be treated to extract and recover solubilized molybdate values therein, thereby further increasing the yield and efficiency of the purification process.

Additional benefits and advantages of the present invention will become apparent upon a reading of the description of the preferred embodiments taken in conjunction with the accompanying drawing and the specific examples provided.

BRIEF DESCRIPTION OF THE DRAWING

FIG. 1 comprises a schematic flow diagram of the important process steps for effecting a purification of a molybdenum oxide concentrate in accordance with one of the embodiments of the present invention; and FIG. 2 comprises a partial schematic flow diagram in accordance with an alternative embodiment of the invention.

DESCRIPTION OF THE PREFERRED EMBODIMENTS

The concentrations and/or compositions of the various feed materials, substances and solutions, as herein described and as set forth in the subjoined claims, are expressed in terms of percentages by weight unless clearly indicated to the contrary.

The impure feed material comprises a particulated technical grade concentrate consisting predominantly of molybdenum oxide which contains various contaminating metal constituents and compounds thereof in concentrations depending upon the characteristics of the original ore body and the manner by which the concentrate is produced. Conventionally, such molybdenum oxide concentrates are produced by roasting molybdenite ($MoS_2$) concentrates at elevated temperature in the presence of excess air to convert the predominant portion of the molybdenum sulfide to molybdenum trioxide.

The molybdenite concentrate itself can be produced by any one of a variety of ore beneficiation processes in which the molybdenite constituent in the ore body is concentrated so as to reduce the gangue to a level less than about 40%, and more usually to a level of less than about 20%. One of the largest known sources of molybdenite ore is at Climax, Colo., in which the ore body comprises a highly silicified and altered granite through which the molybdenite is distributed in the form of very fine-sized veinlets as relatively soft, hexagonal, black flaky crystals present in a concentration of only about 0.3% to about 0.6% as mined. A preferred method of producing the molybdenite concentrate comprises subjecting the molybdenite containing ore to a grinding operation, whereby the ore is reduced to particles of an average size usually less than about 100 mesh, and whereafter the pulverized ore is subjected to an oil flotation extraction operation employing hydrocarbon oils in combination with various wetting agents, whereby the particles composed predominantly of molybdenum disulfide are retained in the flotation froth, while the gangue constituents composed predominantly of silica remain in the tailing portion of the pulp. The flotation beneficiation process normally involves a series of successive flotation extraction operations, each including an intervening grinding operation, whereby the residual gangue constituents in the concentrate are progressively reduced to the desired level. Technical grade molybdenite concentrates commercially produced by the oil flotation beneficiation process usually contain less than about 10% gangue, and more usually from about 5% to about 6% gangue, with the balance consisting essentially of molybdenum disulfide.

The molybdenite concentrate is next subjected to an oxidation step to effect a conversion of the molybdenum sulfide constituent to molybdenum oxide. Perhaps the most common oxidation technique employed comprises roasting the concentrate in the presence of excess air at elevated temperatures ranging from about 600° C up to a temperature below that at which molybdenum oxide melts. The roasting operation is preferably carried out from about 550° C to about 700° C utilizing a multiple-hearth furnace incorporating a plurality of annular-shaped hearths disposed in vertically spaced relationship, on which the molybdenite concentrate is transferred and passes in a cascading fashion downwardly from the uppermost hearth to the lowermost hearth while being exposed to a countercurrent flow of hot flue gases. Typical of roasting apparatuses of the foregoing type are those commercially available under the designation Herreshoff, McDougall, Wedge, Nichols, etc.

The resultant roasted concentrate consists predominantly of molybdenum oxide, of which the major proportion thereof is in the form of molybdenum trioxide. When the feed material is of a particle size generally greater than about 200 mesh, or wherein some agglomeration of the particles has occurred during the roasting operation, it is usually preferred to subject the roasted concentrate to a supplemental grinding or pulverizing step, such as a ball milling operation, whereby any agglomerates present are eliminated, and wherein the concentrate is reduced to an average particle size of less than 200 mesh, and preferably, less than about 100 mesh.

As shown in the flow diagram comprising FIG. 1, the molybdenum disulfide concentrate, after the roasting step, is transferred in the form of a technical grade molybdenum oxide feed material to a mixer to which an aqueous acid solution is added to form a slurry. The concentration of the feed material in the slurry may range from as low as about 5% up to about 40% solids. Amounts less than about 5% are undesirable for economic considerations, while concentrations in excess of about 40% solids are undesirable due to the difficulty of pumping the slurry and maintaining a uniform dispersion of the solid particles therein. Preferably, the solids content of the slurry is controlled within a range of about 20% up to about 25%. The aqueous acid solution employed in forming the slurry contains a mineral acid selected from the group consisting of sulfuric acid, nitric acid, hydrochloric acid, as well as mixtures thereof, of which sulfuric acid itself is the preferred acid. The concentration of acid in the aqueous acid solution employed for forming the slurry is controlled within a range of about 5% up to about 20%, and preferably within a range of about 5% to about 6%. The specific acid concentration is controlled in consideration of the solids content of the slurry and the quantity of contaminating metals present in order to provide a sufficient supply of acid in excess of that stoichiometrically required to react with the contaminating metals and metal compounds to effect a solubilization thereof during the subsequent autoclaving step.

The slurry is thereafter transferred to an autoclave in accordance with the flow diagram of FIG. 1, equipped with agitation sufficient to maintain the particles in substantially uniform suspension. The slurry is heated within the autoclave to a temperature ranging from about 150° C up to about 350° C, and preferably from about 200° C to about 250° C. Temperatures less than about 200° C are usually undesirable from a commercial standpoint due to the increased residence time required to effect the oxidation and conversion reactions, while temperatures in excess of about 250° C are ordinarily unnecessary and undesirable for economic considerations. The autoclaving operation is carried out in the presence of an oxygen partial pressure of at least about 100 psi to as high that permitted by equipment limitations. Usually, oxygen partial pressuresof up to about 300 psi are satisfactory for providing a commercially satisfactory rate of reaction, whereby sub-oxides of molybdenum ($MoO_2$, $Mo_3O_8$, $Mo_5O_{11}$, e.g.) are oxidized to molybdenum trioxide, and whereby contaminating metal molybdites and sub-molybdate compounds thereof are converted to aqueous acid soluble molybdate compounds.

In addition to effecting a solubilization of the contaminating metal and metal compounds present, particularly potassium and sodium, the autoclaving step further increases the yield of molybdenum trioxide by the conversion of suboxides to the molybdenum trioxide state, further enhancing the efficiency and economy of the precess. While the residence time of the slurry in the autocalve will vary depending upon the concentration and type of contaminating metal and metal compounds present, the solids concentration of the slurry, the type and concentration of the mineral acid employed, and the temperature and oxygen partial pressure present in the autoclave, residence times ranging from about 30 minutes up to about 90 minutes at an oxygen partial pressure of about 200 psi and at a temperature of about 250° C are usually adequate for effecting a substantially complete reaction and solubilization of the contaminating metal and metal compounds present and a conversion of the sub-oxides to the trioxide state.

The oxygen partial pressure within the autoclave can be achieved by introducing air, by using oxygen-enriched air, as well as by employing substantially commercially pure oxygen itself.

At the conclusion of the autoclaving operation, the pressure is released in the autoclave and the slurry is transferred in accordance with the flow diagram shown in FIG. 1 to a filter A to effect an extraction and recovery of the solids comprising predominantly molybdenum trioxide and the insoluble gangue constituents composed predominantly of silica. The cake from filter A, in accordance with the embodiment shown in FIG. 1, is transferred to a leaching tank in which it is leached with an aqueous ammonical solution containing from about 10% up to about 20% ammonium hydroxide, and preferably from about 15% to about 20% ammonium hydroxide. The leaching operation is carried out at at temperature ranging from about 20° C up to bout 80° C, and preferably around 20° C. The leaching step is performed so as to effect a conversion of the molybdenum trioxide constituent in the filter cake to solution soluble ammonium molybdate compounds and the resultant solution and residual solids are thereafter transferred to filter B in which the undissolved solid particulate residue is extracted and the filter cake transferred to waste. The filtrate, as shown in FIG. 1, consisting predominantly of an aqueous ammoniacal solution of a purified ammonium molybdate, is transferred to a crystallizer, such as an evaporative crystallizer, from which a high purity ammonium dimolybdate (ADM) product is recovered. The residual liquid from the evaporative crystallizer, in accordance with the flow diagram of FIG. 1, is recovered in a condenser and is recycled back to the ammonialcal leach tank together with make-up ammonium hydroxide solution.

It is also contemplated that all or a portion of the ammonium dimolybdate product can be subjected to a further calcination treatment as shown in the flow diagram in which it is heated to an elevated temperature from about 500° C to about 600° C for a period of time to thermally decompose the ammonium dimolybdate compound, producing a corresponding high purity molybdenum trioxide product. The ammonia vapors produced in the calciner are conveniently recovered int he condenser and are recycled to the ammoniacal leaching tank.

In accordance with an alternative embodiment as shown in the partial flow diagram comprising FIG. 2 of the drawing, the cake derived from filter a is leached with an aqueous alkali metal hydroxide solution to form the corresponding solution soluble alkali metal molybdate compound. It will be understood that the terms "alkali metal hydroxide" and "alkali metal molybdate compounds", as herein employed and as set forth in the subjoined claims, is used in is broad sense to encompass alkali metal hydroxides and alkali molybdate compounds containing postassium, sodium and ammonium. Accordingly, in the specific embodiment shown in FIG. 2, the alkali metal hydroxide may comprise potassium hydroxide or sodium hydroxide to produce the corresponding potassium molybdate or sodium molybdate compound. These latter two alkali metal molybdate compounds in a high purity form are also of commercial utility and the process can be varied so as to produce the desired end product. Since potassium and sodium molybdate compounds cannot readily be thermally decomposed by calcination as in the case of ammonium molybdate compounds, the potassium and sodium molybdate compounds are not subjected to any calcination treatment after recovery from the crystallizer unit.

In accordance with the arrangement shown in FIG. 2, the aqueous alkali hydroxide leaching of the cake derived from filter A employing a potassium hydroxide or sodium hydroxide solution, can be performed under substantially the same conditions and concentrations as hereinbefore described in connection with the ammoniacal leaching in accordance with the flow diagram of FIG. 1. However, the total concentration of the potassium hydroxide or sodium hydroxide employed in the leach solution is controlled so as to be substantially equal to that stoichiometrically required to form the corresponding potassium or sodium molybdate compounds. Amounts in excess of that stoichiometrically required are undesirable since the unreacted potassium or sodium present constitutes a contaminant in the final alkali metal molybdate product. Because the potassium hydroxide and sodium hydroxide aqueous leach solutions are not volatile as in the case of the ammoniacal leach solution, higher temperatures can be satisfactorily employed during the leaching operation. Accordingly, the leaching operation can be carried out at temperatures above the boiling point of the aqueous solution, with temperatures ranging from about 50° C to about 100° C being preferred generally.

At the conclusion of the leaching step, the slurry, in accordance with the arrangement shown in FIG. 2, is transferred to filter B and the cake is transferred to waste; while the filtrate, in the same manner as previously described in connection with the flow of FIG. 1, is transferred to a crystallizer, and the potassium molybdate or sodium molybdate products are recovered. The water vapor derived from the crystallizer can be condensed as before and returned to the leaching tank together with make-up potassium or sodium hydroxide.

In accordance with a preferred practice of the present process, the filtrate from filter A, as shown in the flow diagram comprising FIG. 1, is subjected to further treatment to recover the predominant portion of solubilized molybdate anions therein. This can be conveniently accomplished by ion exchange, as well as neutralization and precipitation techniques. For example, an anion exchange resin such as a tertiary amine in a styrene divinylbenze matrix, available under the designation IRA 93 from Rohm & Haas; tertiary amine type resins such as types XE 270 and XE 299, also available from Rohm & Haas; epichlorhydrine polyamine condensation-type (aliphatic polyamine types), available in a granular state under the designation A-305 from Ionic Chemical Co.; as well as other equivalent types, and be employed to selectively extract the molybdate anions from a substantially neutral or slightly acidic solution, permitting the contaminating metal cations to pass through the ion exchange column and the effluent after suitable post-treatment, can harmlessly be discharged to waste. The filtrate, if necessary, may be adjusted to a pH ranging from about 3 up to about 6.5 by the addition of a suitable base thereto, such as sodium hydroxide. The anion exchange resin is conditioned prior to use by treating it with a dilute caustic solution such as, for example, an 8% sodium hydroxide solution, fillowed by a sulfuric acid solution wash usually of a concentration of about 4% to about 8, to effect a conversion thereof to the bisulfate form. After a loading of the resin with molybdate anions, the anion exchange resin can be eluted, such as by employing an aqueous solution of ammonium hydroxide, and the resultant eluate containing ammonium molybdate is transferred to the ammoniacal leaching tank together with the cake derived from filter A for further processing.

Alternatively, the molybdate anions solubilized in the filtrate from filter A can be recovered by passing the filtrate through a cation exchange column in which the contaminating metal cations dissolved therein are selectively adsorbed and the effluent, consisting predominantly of molybdate anions, is returned to the ammoniacal leaching tank together with the filter cake from filter A. Cation exchange resins suitable for use include Amberlite IR 120, which is a sulfonic-type cation exchange resin commercially available from Rohm & Haas. Other equivalent type cation exchange resins that are effective for adsorbing contaminating metal cations, such as potassium, copper, calcium, magnesium, and iron in a slightly acidic environment, can also be satisfactorily employed. The filtrate can be adjusted to an appropriate pH by the addition of a base such as, for example, caustic, A preconditioning of the resin prior to use to convert it to the hydrogen form can be achieved with an acid, such as sulfuric acid. After loading, the contaminating metal cations adsorbed thereon are stripped with sulfuric acid hydrochloric acid employing solutions at acid concentrations such as 5% up to about 10%. The resulting eluate, after appropriate post-treatment, can be harmlessly transferred to waste.

Still another alternative method for recovering the solubilized molybdate anions from the filtrate from filter A is by effecting a neutralization thereof in a neutralization tank employing an alkaline calcium compound effecting a reaction with the dissolved molybdate anions, as well as the other metal cation species with the exception of potassium, forming precipitates which are recovered by filtration. The filtrate containing predominantly all of the contaminating potassium ions, after post-treatment can be harmlessly discharged to waste.

In order to further illustrate the practice of the present process, the following typical example is provided. It will be understood that the example is provided for illustrative purposes and in not intended to be limiting of the scope of the present invention as herein described and as set forth in the subjoined claims.

EXAMPLE

Two hundred grams of technical grade molybdic oxide (60.76% Mo, 0.18 % K, 5.94% acid insoluble) is placed in a 1-liter autoclave (Parr Instrument Co., 316SS, equipped with a motor-driven stirrer) with 400 grams of 5% sulfuric acid (slurry conc. 33⅓ %). The autoclave is closed, oxygen is introduced to a total pressure of 100 psig, and heating and stirring are commenced. After approximately 90 minutes, the temperature reaches 200° C, whereupon additional oxygen is added to a total pressure of 400 psig, an the stirring is continued at 200° C for 90 minutes, Upon cooling and opening of the autoclave, the slurry is vacuum-filtered, the cake is washed with 250 ml deionized water and the wash water is combined with the filtrate. The washed filter cake is stirred for 4 hours in 900 ml of aqueous ammonia (9% $NH_3$). No heat is applied, but the temperature rises to 50° C briefly from the heat of solution of the molybdic oxide. The slurry is vacuum-filtered, and the filter cake, the ammonia-insoluble residue, is washed with 30 ml of deionized water. The combined filtrate and wash water is evaporated to dryness at 105° C to recover the ammonium dimolybdate (ADM). The concentrations and distributions of potassium and molybdenum in the ammonium dimolybdate product, the feed, the autoclave leach filtrate, and the ammonium hydroxide leach residue, are shown in the following table:

What is claimed is:

1. A process for producing a high purity alkali molybdate product from an impure molybdenite concentrate which comprises the steps of providing an impure particulated molybdenite feed material consisting predominantly of $MoS_2$, oxidizing said feed material to convert substantially all of the $MoS_2$ to molybdenum oxide, mixing the oxidized said feed material with an aqueous acid solution to form a slurry containing from about 5% up to about 40% solids, said acid solution containing a mineral acid selected from the group consisting of sulfuric acid, nitric acid, hydrochloric acid and mixtures thereof wherein said acid is present in an amount in stoichiometric excess of that required to react with the contaminating metals and metal compounds present in said feed material, autoclaving said slurry at a temperature of from about 150° C to about 350° in the presence of a free oxygen partial pressure of at least about 100 psi for a period of time sufficient to convert the predominant portion of molybdenum compounds present in said feed material to molybdenum trioxide and a conversion of the predominant portion of contaminating metal sub-molybdate compounds present to aqueous acid solution soluble compounds, subjecting the autoclaved said slurry to a separation treatment to recover the solids from said acid solution, treating the separated said acid solution to remove and recover the major portion of dissolved molybdate anions therein, leaching the recovered said solids with an aqueous alkali hydroxide solution to effect a conversion of the molybdic oxide constituents therein to soluble alkali metal molybdate compounds, separating said aqueous alkali hydroxide solution containing the solubilized alkali metal molybdate compounds from the remaining insoluble residue, and recovering the alkali metal molybdate compounds from said aqueous alkali hydroxide solution as a high purity alkali metal molybdate product.

2. The process as defined in claim 1, in which said alkali hydroxide is selected from the group consisting of ammonium hydroxide, potassium hydroxide and sodium hydroxide.

3. The process as defined in claim 1, in which said alkali hydroxide comprises ammonium hydroxide and where said alkali metal molybdate product comprises ammonium molybdate.

4. The process as defined in claim 3, including the further step of calcinating said ammonium molybdate product at an elevated temperature to effect a thermal decomposition thereof and recoving a high purity molybdenum trioxide product.

5. The process as defined in claim 3, in which the step

| Sample | Amount of Sample | Potassium | | | Molybdenum | | |
|---|---|---|---|---|---|---|---|
| | | Concentration | Units | Distribution | Concentration | Units | Distribution |
| Feed | 200 g | .174% | | | 60.65% | | |
| ADM | 211.3 g | 28 ppm | .0059 | .3% | 56.2% | 118.75 | 98.18% |
| Autoclave leach filtrate | 556.6 ml | 3 gpl | 1.6698 | 97.6% | 3.54 gpl | 1.97 | 1.63% |
| $NH_4OH$ leach residue | 11.6 g | .302% | .0350 | 2.1% | 1.86% | .26 | .18% |

While it will be apparent that the invention herein disclosed is well calculated to achieve the benefits and advantages as set forth above, it will be appreciated that the invention is susceptible to modification, variation and change without departing from the spirit thereof.

of leaching the recovered said solids with an aqueous ammonium hydroxide solution is performed at a temperature ranging from about 20° C to about 80° C.

6. The process as defined in claim 3, in which the step of leaching the recovered said solids with an aqueous ammonium hydroxide solution is performed with a solution containing about 10% to about 20% ammonium hydroxide.

7. The process as defined in claim 1, including the further step of pulverizing the oxidized said feed material to an average particle size of less than about 200 mesh prior to formation of a slurry by mixing said feed material with an aqueous acid solution.

8. The process as defined in claim 1, in which the step of autoclaving said slurry is performed at a temperature ranging about 200° C to about 250° C.

9. The process as defined in claim 1, in which the step of autoclaving said slurry is performed in the presence of a free oxygen partial pressure of from about 100 psi to about 300 psi.

10. The process as defined in claim 1, in which said aqueous alkali hydroxide solution comprises an alkali metal hydroxide selected from the group consisting of potassium hydroxide and sodium hydroxide and wherein said alkali metal hydroxide is present in an amount substantially equal to that stoichiometrically required to convert the molybdenum oxide constituents in said solids to soluble alkali metal molybdate compounds.

* * * * *